United States Patent [19]
Torres

[11] 3,838,298
[45] Sept. 24, 1974

[54] ELECTRONIC MAGNETO
[76] Inventor: Fuasto Orlando Torres, Peru 89, Piso 2, Buenos Aires, Argentina
[22] Filed: Feb. 9, 1973
[21] Appl. No.: 331,032

[52] U.S. Cl............... 307/309, 315/209 T, 123/148
[51] Int. Cl.............................................. H01v 5/00
[58] Field of Search................. 307/309; 315/209 T; 123/148

[56] References Cited
UNITED STATES PATENTS

| | | | |
|---|---|---|---|
| 3,390,668 | 7/1968 | Hufton | 307/309 X |
| 3,390,669 | 7/1968 | Hufton | 315/209 T |
| 3,342,167 | 9/1967 | Tarter | 123/448 |

Primary Examiner—John W. Huckert
Assistant Examiner—B. P. Davis
Attorney, Agent, or Firm—Robert E. Burns et al.

[57] ABSTRACT

It comprises an electromagnetic device and an additional electronic circuit capable of amplifying the electric pulses supplied by said electromagnetic device, which consists of a horseshoe shaped and symmetric core, integrated by two curved sectors alternately butt junction stacked, riveted plates, which, at their free ends, provides in each case polar pole pieces opposing each other; with a coil located in the central body of the core, comprising a primary winding and a secondary winding, adequately insulated between each other, and with inidividual output terminals, to which is connected th electronic circuit referred to, which, in turn, consists of a first transistor and a second transistor interconnected between each other in the following way: the base of the first transistor is connected to the collector of the second transistor, by means of a resistor; another resistor interconnects the positive power supply line to the collector of this second transistor, while the collector of the first transistor is interconnected to the base of the second transistor, and also ties into the battery positive line by means of another resistor and to the secondary winding of the electromagnetic device, whereas the emitter of the latter is connected to the negative power supply line by means of another resistor, at the same time. The collector of the second transistor is tied by means of a capacitor, to an output terminal, being moreover, connected to the positive 12-volts battery line and to the primary winding of the electromagnetic device, a rectifier diode and a capacitor, while another resistor is connected between the emitter of the second transistor and negative power supply line.

3 Claims, 7 Drawing Figures

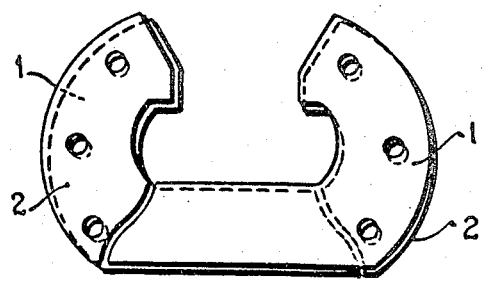
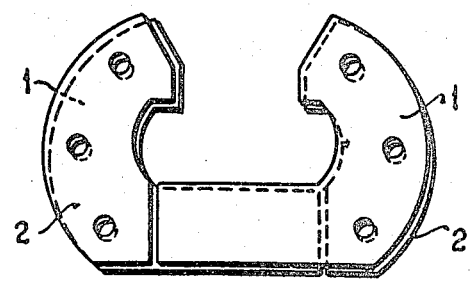
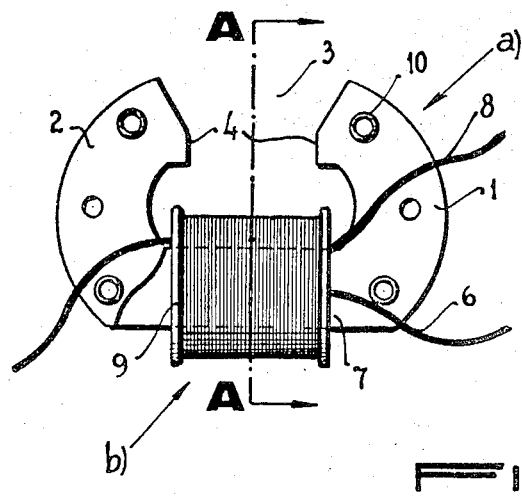
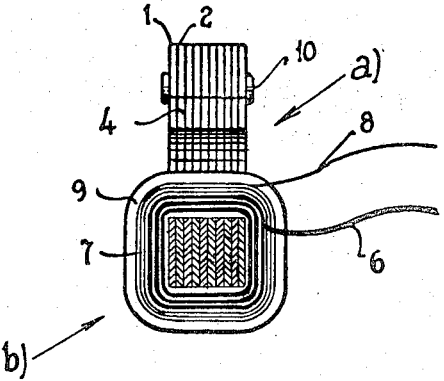
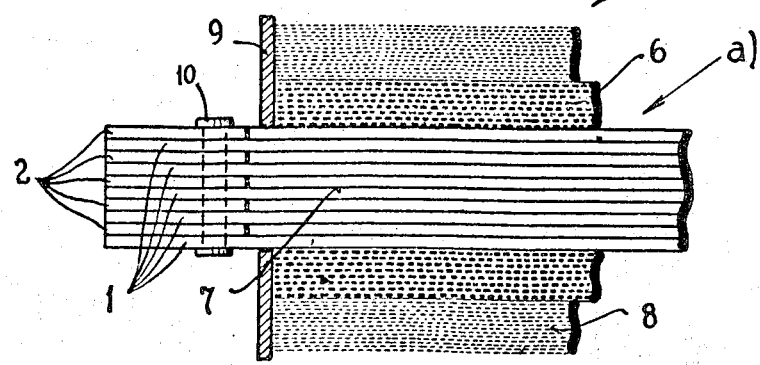

ELECTRONIC MAGNETO

The present invention refers to an Electrical Impulse Generator Electromagnetic Device that is placed on the breaker plate in the stock ignition distributor of a gasoline engine, in substitution of the classic mechanical breaker points, similar to a miniature low-tension alternator in which the frequency and amplitude of output voltage, dependent on the R.P.M. of the breaker cam, is impedance matched to a transistorized power module which converts the low trigger signal from the distributor into a high voltage output ignition coil, through a capacitive discharged system circuit in, electrically advised with the angular position of the crankshaft, to furnish the sparks to light the air/fuel mixture in the cylinder on each power stroke, behaving itself as a Pointless Electronic Magneto for the ignition of gasoline engines.

The described inherent components, generate high power sparks to burn away the air-fuel mixture, in similar way to those generated by a high-quality conventional ignition magneto, with the only difference that these sparks are generated by an electronic process, rather than by an inductive ignitive system and common contact points spring loaded, which is closed and opened each time by the breaker cam, avoiding the usual troubles such as: erosion of the points, wastage of the fiber rubbing block, poor performance for loss of dwell settings, contact surface deterioration due to high current breaker points, limited optimum R.P.M. operation, etc.

This electromagnetic device has the purpose to replace the breaker points, which merely serve as a mechanical switch in the conventional system and it may be said that has passed the test of time as a simple and reliable system, by one pointless system of reduced dimensions, with higher and better operational characteristics, having proved to be effective because of its simplicity.

It is very well known that an electromagnetic transducer usually introduces some phase difference in a matched electronic circuit, deriving from the inductance of its windings when the frequency comes into action. In this variable inductance transducer the electromagnetic field generated by the direct current flowing through a primary coil, is coupled to the secondary coil by a magnetically permeable core and a stimulus moving part, which usually moves relative to the fixed winding coil.

The breaker cam rotation actuates this moving part, developing in the secondary winding a trigger voltage of very low amplitude by changing the amount of inductive coupling. This type of transducer, by the principle of variable reluctance, introduces a delay in the high-voltage surge that is conducted to the spark plugs with respect to the precise piston position in the cylinder, which is more accentuated as the engine speed increases.

Owing to this phenomenon, this type of transducer did not prove successful as a practical electrical pulse generator to be used in electronic ignition systems, and which well strive with the present pick-ups introduced in the market for the excitation of such systems, consisting of permanent magnets, photoelectric cells and variable coupling or frequency devices, owing to its robust design, reliable operation and low cost to produce, what would be economically feasible for the replacement automotive market.

One of the greatest disadvantages of the inductive system lies in the decrease of intensity of the spark when the engine speed increases over 5,500 and more R.P.M., sometimes being reduced to less than 10 Kv, when the required voltage should amount at least to the double of said value.

Low ionization voltage causes incomplete combustion, resulting poor engine performance and wasted gasoline. The modern automobile with higher compression ratios, increased engine speeds and more horsepower and using fuels which contain many additives, tends to over work the ignition system even more; unless it is improved, there will be a marked decline in long-term engine reliability and efficiency.

These facts motivated the development of the present electronic contactless ignition system to rescue the conventional ignition from the heavy demands subjected as well as with great possibilities of reducing air pollution due to the reduction of hydrocarbons and carbon monoxide to such a low limits that no special antismog devices are required, due to the complete combustion of the mixture caused by the high power sparks in the cylinder.

To facilitate a better interpretation, both of the design and functional aspect of the invention under consideration, illustrative complementary drawings are enclosed herewith, in which:

FIG. 3 shows the two plates integrating a core lamination and its alternately arrangement. In the present case, the plates are curved butting junction.

FIG. 4 is a view similar to the previous one but demonstrating the straight butting junction of both plates.

FIG. 5 shows a view of the assembled core with its windings.

FIG. 6 shows the cross sectioned right side view as shown by section A—A in the preceding figure.

FIG. 7 shows the cutting plane extends along the longitudinal section, drawn out of scale, showing the alternately stacking plates 1 and 2 packaged to form the core assembly.

In order to associate the mentioned drawings with the descriptive text given hereafter, identical parts or elements shown in the various figures of these drawings have been distinguished by common reference letters and numbers.

Figure 1:
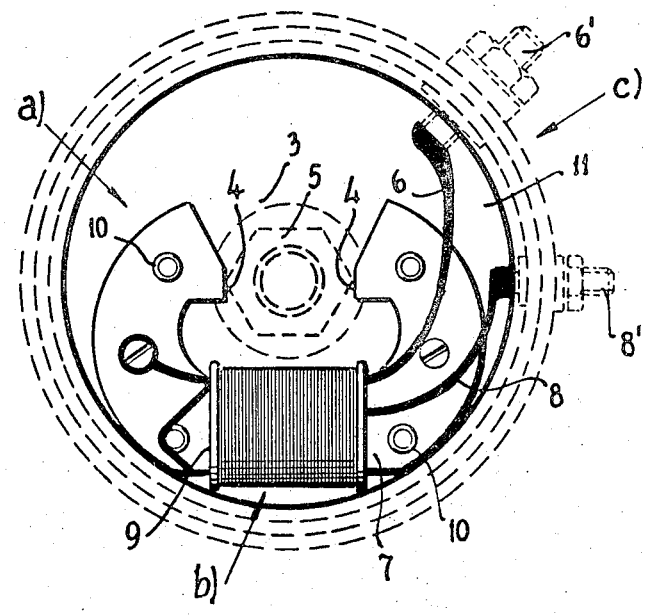
FIG. 1 represents a top view of the electromagnetic device, arranged in the interior of the ignition distributor housing of a gasoline engine.
Figure 2:
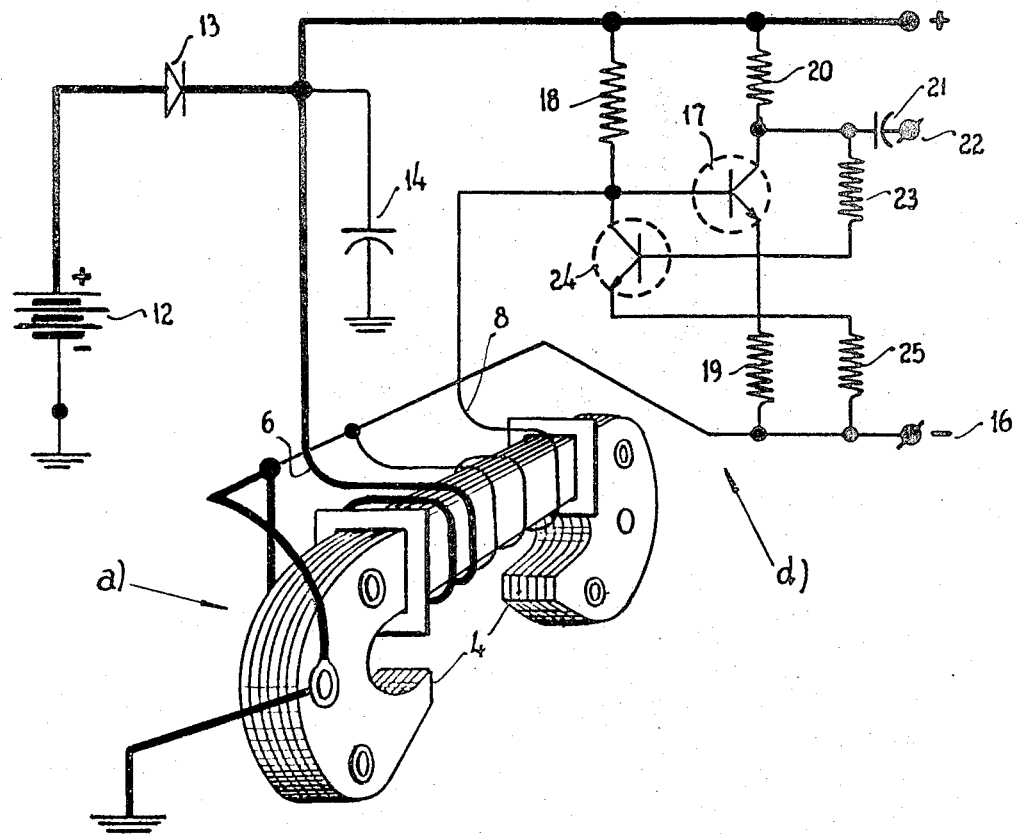
FIG. 2 represents an electronic diagram showing the electronic circuit added to the electromagnetic device shown in the previous figure.

Referring in the first place to the electromagnetic device, we would state that, as far as its constructional aspect is concerned, it consists of a magnetic core $a$, made off by segmental plates 1 and 2 as shown in FIGS. 3 and 4, which are alternately butt junction stacked.

Therefore, the magnetic core gets a solid geometrical irregular but symmetric shape with continual lines contours, similar in appearance to a horseshoe form, in which one of the longitudinal extensions presents an opening 3, delimited by two opposed faces 4 that form the polar pole pieces where the magnetic flux generated by the current flowing through the primary coil 6 is concatenated.

The remainder core body, being of homogeneous and continual structure, closes the magnetic circuit with the minimum possible leakage.

The opening 3 may have a rectangular shape, or an obtuse angle shape entrance, which does allow the breaker cam 5 by easily set up in, to produce the magnetic disturbance against the pole pieces 4 when it rotates.

The coil b is made off by the primary excitation winding 6 which sets up the magnetic flux, and the secondary signal winding 8 which provides the electrical pulses, are both wounded one over the other around the core longitudinal central part 7, opposed to the polar pole pieces. The core section and the number of primary wires turns, determine the direct current input voltage.

The main object to shear the core lamination into two alternately butting stacked plates 1 and 2, the shapes of which are indefinite but of continual lines, similar in shaping but with the difference that one of them presents a rectangular extension with the butt junction straight as shown in FIG. 4 or be curved as shown in FIG. 3, which fits closely with the other plate, is to secure the magnetic flux and consequently to reduce the reluctance and keep the magnetizing current small.

It also makes possible the assembling of the coil b through the central part 7 of the core a, making easier the assembling process of the system and at the same time, making it compact and attainable for its adjustment and location inside the stock distributor.

The represented shape of the magnetic core a is due to factors concerned with the design and performance. The irregular and oblonged shape that conforms the curved sides of the core, increases over a wide range the output signal, magnifying the sensitivity of the transducer at low R.P.M., particularly at cranking speed; at the same time its large section introduces some magnetic flux balance, since its mass includes holes for installation procedure and stack rivetting.

Divided into two separable sectors, it permits the arrangement of the insulating coil form 9 over which are wounded two copper coils; the primary winding 6 and secondary winding 8, placed whole in the core central body 7, maintaining the optimum size for its location in the distributor breaker plate and also permits the free passage of the cam breaker 5 when it rotates.

The insulating coil form 9, indicated in the FIG. 5, is made of a high temperature resistance plastic material around which the primary winding 6 and the secondary winding 8 have been wounded strenghtly insulated from one to the other, but with one common output end of each winding joined and grounded together, while the other free output ends are connected at two binding posts 6' and 8' respectively, isolated from the distributor housing c as shown in FIG. 1.

As already mentioned, the present invention is complemented by adding to the electromagnetic device previously described, an electronic circuit d, essentially consisting of two transistors interconnected between them at a modus of electronic switch to control and neutralize the inductive phase shifting introduced by the electromagnetic generator, also working as a pulse amplifier, drives a capacitor discharged network very able to energize the primary ignition coil.

Referring to the FIG. N* 2, the arrangement and operation of the electronic circuit d is as follows: Once the electromagnetic device has been installed in the distributor breaker plate, as shown in FIG. 1, the cam breaker 5 thereof starts rotating, driven by the transmission shaft from the engine, when it starts running. At the same time, the binding post 6', which is connected to the primary winding 6, is electrically connected through the starting switch (not shown) to the electronic circuit system.

In this very instant, the primary winding 6 is energized by a flow current from the battery 12, through the rectifier diode 13, and filter capacitor 14, which, in turn, supplies energy to the other electronic components through positive line 15 and negative line 16 respectively.

The electromagnetic field set-up by the current flowing through the primary winding 6, is coupled to the secondary winding 8 after having been modulated through the magnetic core when a pair of lobules of the breaker cam 5 passing on at the axis of the polar pole pieces 4 disturbs the concatenated magnetic flow, generating in the secondary coil 8 an alternate voltage output of very low amplitude, which is in synchronism with reference of the angular position of the crankshaft and the precise position of the piston in the cylinder at that instant.

This trigger signal that is taken-out through binding post 8', is applied directly to the base of transistor 17 and line 16, which serves as returning signal line and ground respectively. Transistor 17 is biased by means of base resistor 18 and emitter resistor 19, as long as its voltage collector is applied through resistor 20, amplifying the pulses coming down from winding 8, converting them into positive and negative trigger pulses. The negative trigger pulses are deriving to output terminal 22 through capacitor 21, from where it is applied to the capacitive discharged network (not shown) in the circuit.

From the same collector of transistor 17, and through resistor 23, a portion of positive trigger pulses are taken out to trigger the transistor 24, which is biased in parallel with transistor 17 through the common base resistor 18 and the emitter resistor 25, amplifying these pulses that are then applied into the secondary winding 8, altering its inductance, in relation to the primary and natural secondary winding inductance, to that required by R.P.M. engine running speed at that instant.

At low speed, the rated negative triggering pulses at the collector of transistor 17, is low, not so the positive triggering pulses which passing through the resistor 23, saturates transistor 24 at a variable rate, according to the R.P.M. of the engine, causing in its collector a degenerative current flow in correspondence with the transistor gain; entering this degenerative current flow into the winding 8 due to its low resistance rather than to the base of transistor 17 owing to its higher input resistance. This degenerative current flow introduces in the secondary winding 8 a counter-electromotive force of such a value and contrary polarity, that it superposes upon the counter-electromotive produced by the inductive intrinsic energy of the purely inductive secondary winding 8, not absorbing nor returning any inductive energy, obtaining an abrupt null of the potential energy contained in the mobile fluid, reason for which the electric pulse arriving at the base of transistor 17 is entirely neutral.

At any other engine speed, the events occur in the same order, with the difference that the integration of negative pulses at the collector of transistor 17 is larger and smaller is the degenerative current injection into the secondary winding 8. However, generally speaking, the neutralization is complete for all speed and proportional to the values necessary to obtain the best operational advances ignition timing, depending on engine R.P.M. and throttle position. This makes the spark jump earlier or later in the power stroke, with the complete removal of the delay of the spark, to which are exposed the electromagnetic transducer as the frequency to which it is subjected, is taking effects.

The above description and representations clearly point-out the construction and function advantages characterizing the invention under consideration, and it is not deemed necessary to go into more details in this matter, except the express statement that the inventor has the right to introduce further modifications of details, without giving-up the limits and scopes of the following claims.

The present invention and the way in which it may be put into practice having been described, the following claims, with the inclusive property rights of the inventors, are hereby made:

1. Electronic magneto, characterized by the fact that it comprises an electromagnetic device and an additional electronic circuit capable of amplifying the electric pulses supplied by said electromagnetic device, which consists of a horseshoe shaped and symmetric core, integrated by two curved sectors alternately butt junction stacked, rivetted plates, which, at their free ends, provides in each case polar pole pieces opposing each other; with a coil located in the central body of the core, comprising a primary winding and a secondary winding, adequately insulated between each other, and with individual output terminals, to which is connected the electronic circuit refered to, which, in turn, consists of a first transistor and a second transistor interconnected between each other in the following way: the base of the first transistor is connected to the collector of the second transistor, by means of a resistor; another resistor interconnects the positive power supply line to the collector of this second transistor, while the collector of the first transistor is interconnected to the base of the second transistor, and also ties into the battery positive line by means of another resistor and to the secondary winding of the electromagnetic device, whereas the emitter of the latter is connected to the negative power supply line by means of another resistor, at the same time. The collector of the second transistor is tied by means of a capacitor, to an out-put terminal, being moreover, connected to the positive 12-volts battery line and to the primary winding of the electromagnetic device, a rectifier diode and a capacitor, while another resistor is connected between the emitter of the second transistor and negative power supply line.

2. Electronic magneto, according to the preceding claim and characterized by the fact that the magnetic core of the electromagnetic device is a thin punched-out lamination, sheared into two sectors of the same shape but of different dimensions which are alternately butting junction stacked, so that two packages having the same quantity of sectors are formed when each stacking is pressed and rivetted.

3. Electronic magneto, according to the claim 1 and characterized by the fact that the magnetic core of the electromagnetic device is formed by sticking butt two solid segments sectors.

* * * * *